June 26, 1956     B. P. SCHILTZ     2,751,822

BROACHING MACHINE WITH ANTI-CHATTER CONTROL

Filed Oct. 13, 1951     2 Sheets-Sheet 1

INVENTOR.
BERNARD P. SCHILTZ

BY
RICHEY, WATTS, EDGERTON & McNENNY

ATTORNEYS

June 26, 1956 B. P. SCHILTZ 2,751,822
BROACHING MACHINE WITH ANTI-CHATTER CONTROL
Filed Oct. 13, 1951 2 Sheets-Sheet 2
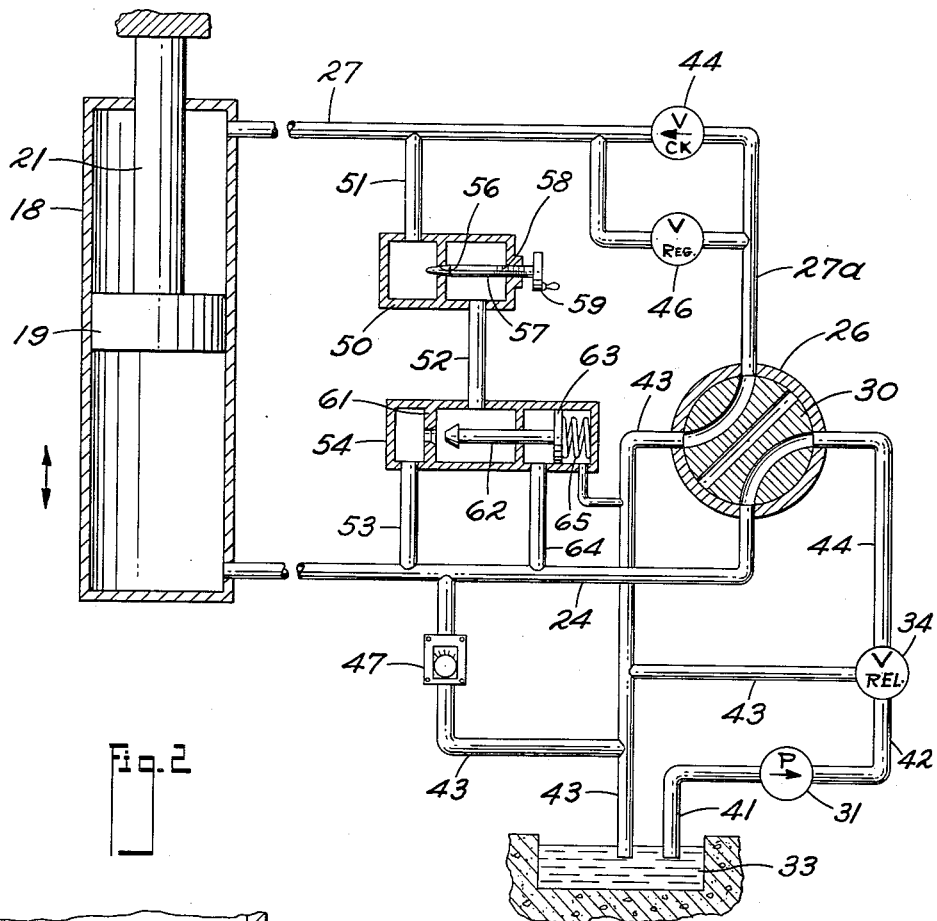
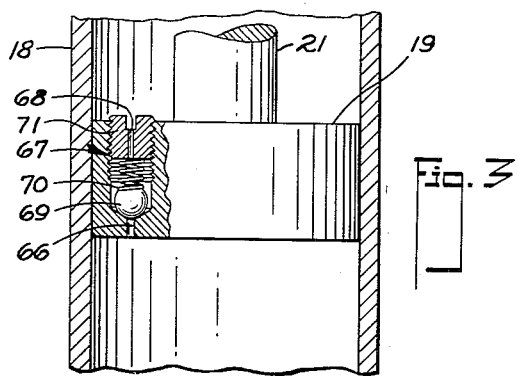
INVENTOR.
BERNARD P. SCHILTZ
BY
RICHEY, WATTS, EDGERTON & McNENNY
ATTORNEYS United States Patent Office 2,751,822
Patented June 26, 1956

2,751,822

BROACHING MACHINE WITH ANTI-CHATTER CONTROL

Bernard P. Schiltz, Cleveland, Ohio, assignor to The Foote-Burt Company, Cleveland, Ohio, a corporation of Ohio Application October 13, 1951, Serial No. 251,200

5 Claims. (Cl. 90—33)

This invention relates to broaching machines and to hydraulic mechanisms, the preferred embodiment of the invention residing in a hydraulic system for surface broaching machines. Surface broaching machines customarily employ a hydraulic cylinder for reciprocating the broaching tool.

The principal object of the invention is to improve the performance of hydraulically operated machines, including broaching machines, by eliminating or substantially eliminating the chatter of the reciprocating mechanism.

A problem which has long been encountered in the operation of broaching machines, particularly in surface broaching, and particularly in cutting of certain tough and hard materials, has been that of chatter of the tool slide. This chatter, which may be more fully defined as uneven or oscillating longitudinal movement of the tool, apparently results from the uneven effort involved in driving the broach. This uneven effort arises from several causes, one, of course, being the fact that since a limited number of cutting teeth are in use at any time, the number of cutting teeth varies as teeth enter and leave the work piece. Chattering may also be caused by irregularities in surface or in the hardness or toughness of the work being broached.

The chattering of the machine is objectionable, as is well known to those skilled in the art, because the teeth of the broach are dulled, thus reducing the quantity of the work which may be produced between sharpening periods. Further, the vibration of the machine becomes so intense at times that the operation of mechanisms in the vicinity of the machine may be seriously affected. In some cases, the vibration has been so serious that it has prevented the application of surface broaching methods to certain materials such as tool steel which, due to its hardness and toughness, produces the highest degree of chattering.

Thus, the advantages of speed, precision, and economy of production inherent in the surface broaching operation have not been available in some cases because the problem of chatter has not been solved prior to this invention, although the problem has long existed.

It appears that the reason for the existence of chatter or vibration lies in the fact that the hydraulic fluid employed to drive the broach slide is slightly compressible. With cylinders of substantial length, the compression of the fluid becomes an appreciable quantity toward the end of the stroke. As any one of the many cutting teeth on a broach leaves the work, the force required to drive the slide is momentarily reduced. Since the hydraulic fluid has been compressed, the slide is driven forward rapidly for a short distance by the residual pressure stored in the fluid until the expansion has taken place and the pressure reduced to that required to balance the force required by the teeth which are then in engagement with the work. This distance of sudden movement is in the order of fifteen or twenty-thousandths of an inch, but with the inertia of the masses involved produces a substantial jar to the frame of the machine. This jar must be absorbed by the cutting edges of the broach and the increased velocity and sudden forces involved in damaging thereto. As a matter of experience, the life of the cutting tool may be shortened to 25% of the normal life by the existence of tool chatter.

This invention is based upon the discovery that the provision of an intercommunicating conduit between the two ends of a broach-reciprocating cylinder with a restricted orifice in the conduit eliminates chatter in most cases and in even the most difficult conditions substantially eliminates chatter. The bleeding off of a small quantity of the compressed fluid is sufficient to relieve the unnecessarily high pressure on the slide cylinder and thereby eliminate the excess pressure which would otherwise cause the slide to jerk forward.

Although this invention was conceived in response to a problem existing in the broaching field, there is no reason to believe that the advantages of the invention are restricted thereto and it will no doubt prove advantageous in other applications of hydraulic cylinders where chatter has been a problem, as, for example, in other hydraulically operated machine tools.

Another field of use is in feed mechanism for multiple drilling machines. In these machines, when a drill penetrates the work, particularly if it is a large drill, the drilling head jumps forward and may cause breakage of other drills, especially if they are relatively small. Such harmful irregularities of movement are analogous to the irregular movement or "chatter" of broaching machines, and therefore may be remedied by application of the principles of this invention.

The preferred mode of carrying out the invention and the manner in which the objects and advantages thereof are realized will be clear to those skilled in the art from the description herein of the invention as applied to a broaching machine.

Referring to the drawings:

Fig. 2 is a schematic diagram of a hydraulic system for the broaching machine embodying the invention; and Fig. 3 is a fragmentary view showing an alternate form of the invention.

Figure 1:
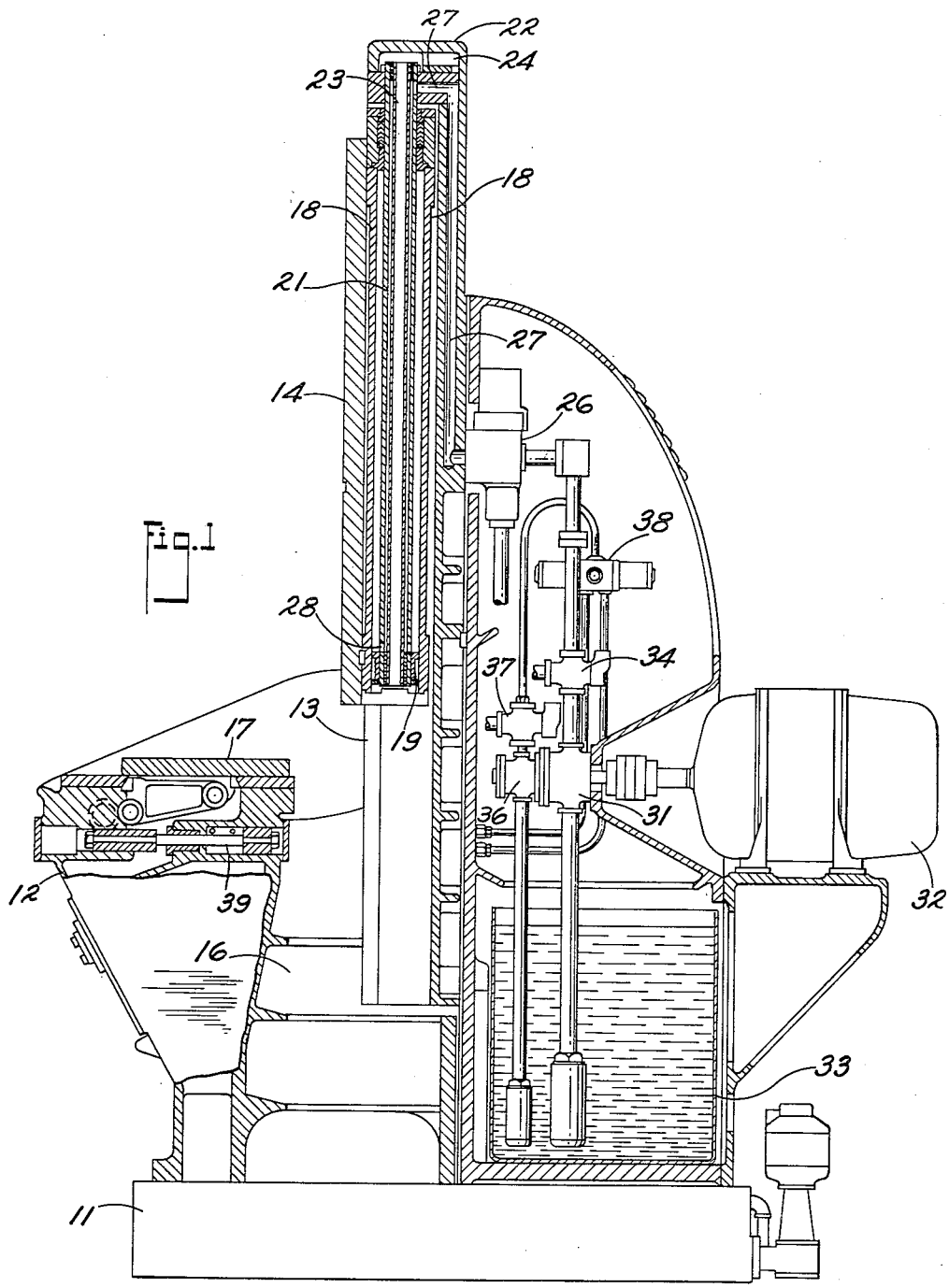
Fig. 1 is a vertical sectional view of a surface broaching machine.

The broaching machine illustrated in Fig. 1 is of known type, and therefore need not be described in detail. The machine has a base 11 on which is mounted a frame which comprises a worktable support 12 and a support for guides or ways 13 for the broaching slide. The broach slide 14 on which the broaches are mounted reciprocates vertically into a well 16. A work table 17 is reciprocated by known mechanisms to bring the work piece into position for shaping by the broach and to retract it after the return (upward) stroke of the broach slide. The broach slide 14 is fixed to a reciprocating cylinder 18 within which is disposed a piston 19 mounted on a hollow piston rod 21. The upper end of the piston rod is mounted in an extension 22 of the frame so that the piston and piston rod remain fixed and the cylinder reciprocates. Hydraulic fluid under pressure to move the cylinder in its downward or broaching stroke is fed through a tube 23 concentric with the piston rod from a conduit 24 in the frame which communicates with a slide control valve 26. Fluid to raise the cylinder is fed from the valve 26 to a passage 27 in the frame which communicates with an aperture in the piston rod and then proceeds through the annular space between the piston rod and the tube 23 and is discharged into the cylinder above the piston through orifices 28 in the lower end of the piston rod.

Hydraulic fluid for the actuation of the broach slide is fed to the valve 26 by a pump 31 driven by a motor 32 and supplied from the reservoir 33. A relief valve 34 interposed between the pump and control valve limits the pressure in the operating system and discharges into the reservoir if the pump output is otherwise blocked. A smaller pump 36, likewise driven by the motor 32 and supplied from the reservoir 33, delivers hydraulic fluid through a relief valve 37 to a control valve 38 which supplies and controls a hydraulic cylinder 39 to actuate the table. Since the table operating mechanism is known in the art and the details thereof are immaterial to the present invention, further description is not necessary.

The invention may be better understood by reference to the schematic diagram of Fig. 2, which illustrates a hydraulic system according to the invention. In Fig. 2, the broach cylinder 18, piston 19, and piston rod 21 are illustrated schematically in the interest of simplicity, and because the details of the arrangement of the cylinder and piston rod are immaterial to the invention. The valve mechanisms are shown in the position corresponding to the downward or broaching stroke. The pump 31, which runs continually, takes hydraulic fluid from the reservoir 33 through a conduit 41 and delivers it by way of the relief valve 34 to the broaching slide control valve 26. Normally, the relief valve remains seated, but if the flow of the hydraulic fluid should be blocked, the relief valve diverts the fluid discharged by the pump through line 43 to the reservoir. The relief valve may be set to open at a pressure of the order of 1,000 pounds per square inch.

The control valve 26 may be of any suitable type and is preferably a slide valve, but for simplicity of illustration it is shown as a simply rotary valve. With the valve 26 in the position shown, fluid under pressure from the conduit 44 is conducted to the fluid line 24 and thereby into the lower end of the cylinder 18. The cylinder and broach slide are thus forced downward and fluid is displaced from above the piston through the conduits 27 and 27a into the valve 26 which discharges it freely into the return line 43. The lines 27 and 27a are coupled to each other through two valves in parallel (not shown in Fig. 1), a check valve 44 and a regulating valve 46. The check valve 44 permits flow of fluid only from the control valve into the cylinder and thus blocks flow from the cylinder, thus forcing the displaced fluid to pass through the regulating valve 46 which is set to maintain a substantial pressure in the line 27 and against the upper surface of the piston 19. This pressure may, as a practical matter, be approximately 200 pounds per square inch. It will be noted that the area above the piston is substantially smaller than the area below the piston (in practical machines about one-half as great) and therefore this back pressure does not seriously oppose movement of the broaching cylinder under power actuation. The valve 46, however, maintains the upper end of the cylinder full of fluid and prevents free fall of the cylinder due to its own weight and the weight of the broach slide.

If the valve plug 30 of the valve 26 is rotated 45° clockwise, the conduits 24 and 27a are blocked off from the high pressure fluid supply and the discharge into the reservoir respectively, so that the cylinder is held in position, and the high pressure line 44 is by-passed to the discharge line 43. If the valve plug 30 is rotated 90° clockwise, the high pressure line 44 is connected to the line 27a and the line 24 is connected to the line 43. Thus, fluid under pressure passes freely through the line 27a, the check valve 44, and the line 27 into the upper end of the cylinder to raise the cylinder and broaching slide. Fluid displaced from the lower end of the cylinder passes through the line 24, valve 26, and line 43 to the reservoir.

As will be obvious to those skilled in the art, automatic cycling control means for the valve 26 to effect automatic or semi-automatic operation of the slide may be provided, but these are not material to the invention and are not described.

The hydraulic system preferably includes also a speed regulating valve 47 interposed between the line 24 leading to the lower end of the cylinder and the discharge line 43.

This valve may be set to by-pass a part of the fluid supplied by the pump 31 to the cylinder and thus reduce the broaching speed of the cylinder below that which would result if the entire displacement of the pump were fed into the cylinder.

In its preferred embodiment, the invention eliminates chatter by the provision of a needle valve communicating with the upper end of the cylinder through a line 51 connected to the supply line 27 and communicating with the lower end of the cylinder through lines 52 and 53 and a shut-off valve 54. During the broaching stroke, the shut-off valve 54 is open and thus fluid may flow through the line 53, valve 54, line 52, valve 50, and line 51 from one end of the cylinder to the other. As will be apparent, the normal direction of flow is from the high pressure side of the cylinder to the low pressure side.

Generally, in operation during the working stroke, the lower end of the cylinder is under higher pressure than the upper end, the pressure in which is determined by the regulating valve 46. However, since the pressure in the upper end of the cylinder is due partly to the weight of the slide, and because the upper end is smaller than the lower end, the pressure in the lower end of the cylinder will be lower than that in the upper end when the cutting load is very light. Under normal cutting loads, however, the pressure in the lower end of the cylinder will exceed that in the upper end. It is probable, however, that whenever there is any irregularity of resistance to movement of the tool which would tend to set up oscillation or chatter, the flow through the needle valve may reverse momentarily.

The needle valve 50, as illustrated schematically, comprises a body comprising two chambers into which the lines 51 and 52 are connected, the chambers being in communication through an opening 56 within which is interposed the conical valve member 57 which is adjustable by virtue of a threaded stem 58 and hand wheel 59.

The valve 54 is a hydraulically operated valve provided with a seat 61 interposed between the lines 53 and 52 and a movable valve plunger 62 adapted to engage the seat and prevent flow of fluid from the line 52 to the line 53. The valve member 62 is lifted from the seat by a piston 63 connected to the valve stem and actuated by the pressure under the piston which may be taken from the line 24 by a branch line 64. A spring 65 normally acts to seat the valve and thus the valve acts as a check valve against flow from the line 52 to the line 53 when the valve is not held open by the piston 63. When the broach cylinder is energized for the working stroke, fluid under pressure from line 24 opens the valve 54 and permits free flow of fluid through the valve in either direction. The valve 54 is desirable, since, if it were not provided, when the valve 26 is in its neutral position, as when the cylinder is resting at the top of the stroke, there would be a slow leakage of fluid through the needle valve and the cylinder would gradually descend. With the valve 54 as described, the by-pass connection through the needle valve is closed except during the working stroke. Obviously, the valve 54 would not be needed in applications to horizontal cylinders.

It is not essential that the valve 54 be opened by the pressure which actuates the hydraulic cylinder, since it may be operated mechanically in connection with the valve 26, or, if the valve 26 is operated by hydraulic pressure supplied from a pilot valve, as is common, the valve 54 may be operated by the same pressure.

When the broaching machine is being used on a material which causes chatter during the operation of the slide, the opening of the needle valve 50 must be adjusted as required by the conditions of operation. No formula or rule for determining the optimum setting of the valve can be predetermined, since the variables of broach condition, material hardness and shape of cut may alter the intensity of the chatter. However, the operator of the machine can vary the opening of the valve 50 and observe the result and achieve the optimum setting without difficulty. As the valve 50 is opened, the chatter gradually decreases until it is eliminated. Further opening of the needle valve causes the broach slide to hesitate as the loads come on the teeth and the speed of the slide is materially decreased. It is obvious that the best valve setting is intermediate the positions at which either the above-mentioned hesitation or chattering occurs. Further adjustment of the valve 50 is not required until the set-up in the machine is changed.

The alternate form of the invention, as shown in Fig. 3, incorporates the restricted by-pass in the piston 19 of the machine. An orifice 66 is formed through the face of the piston 19 where the working pressure of the fluid is applied. A check valve 67 is located in the passage which joins the orifice 66 with the space in the cylinder opposite to the working end. A ball 69 is biased into engagement with the seat in the end of the passage adjacent the orifice by the spring 70. A plug 71 in the passage compresses the spring 70 against the ball 69, an aperture 68 being formed therein to provide communication from the passage to the cylinder.

The orifice 66 serves to meter the flow of fluid from the working end of the cylinder to the low pressure end as required to prevent the chattering of the broach slide. The size of the orifice 66 is determined by experiment to obtain the beneficial effects of preventing chattering without causing hesitation of the broach slide. The check valve 67 closes the passage 68 to prevent leakage of fluid therethrough when the machine is not in operation. The broach slide is held by the valve 67 from descending due to the force of gravity causing the oil to leak through the orifice 66.

When the control system embodied in the invention is applied to a double broaching machine, it is necessary to provide chattering control to each of the cylinders individually to obtain satisfactory results.

The system, as described, is applied to a cylinder which performs the working stroke in only one direction. The principle of the invention is not restricted to such a condition, but is applicable to cylinders which work in both directions and have load conditions affecting the cylinder in an oscillatory manner.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A machine tool comprising a slide reciprocable for effecting a machining operation, a hydraulic cylinder for reciprocating the slide, means for supplying fluid under pressure, a control valve for directing the fluid to the cylinder to control the movement thereof, a regulating valve to oppose flow of fluid displaced from the cylinder, a conduit interconnecting the two ends of the cylinder, and an orifice in the conduit to inhibit chatter of the cylinder.

2. A broaching machine comprising a frame, work-holding means thereon, a broach slide reciprocable past the work-holding means, a hydraulic cylinder for reciprocating the slide, means for supplying fluid under pressure, a control valve for directing the fluid to the cylinder to control the movement thereof, a regulating valve to oppose flow of fluid from the ends of the cylinder which effects the idle stroke of the broach slide, a conduit interconnecting the two ends of the cylinder, and a throttling orifice in the conduit.

3. A broaching machine comprising a frame, work-holding means thereon, a broach slide reciprocable past the work-holding means, a hydraulic cylinder for reciprocating the slide, means for supplying fluid under pressure, a control valve for directing the fluid to the cylinder to control the movement thereof, means to oppose flow of fluid from the end of the cylinder which effects the idle stroke of the broach slide, and hydraulic means connected to said cylinder responsive to variations in fluid pressure in the cylinder for inhibiting oscillatory movements of the slide.

4. A broaching machine comprising a frame, work-holding means thereon, a broach slide reciprocable past the work-holding means, a hydraulic cylinder for reciprocating the slide, means for supplying fluid under pressure, a control valve for directing the fluid to the cylinder to control the movement thereof, a regulating valve to oppose flow of fluid from the end of the cylinder which effects the idle stroke of the broach slide, a conduit interconnecting the two ends of the cylinder, and an adjustable orifice valve in the conduit.

5. A broaching machine comprising a frame, work-holding means thereon, a broach slide reciprocable past the work-holding means, a hydraulic cylinder for reciprocating the slide, means for supplying fluid under pressure, a control valve for directing the fluid to the cylinder to control the movement thereof, a regulating valve to oppose flow of fluid from the end of the cylinder which effects the idle stroke of the broach slide, a conduit interconnecting the two ends of the cylinder, an adjustable orifice valve and a shut-off valve in the conduit in series relation, and means to open the shut-off valve during the working stroke of the cylinder.

References Cited in the file of this patent
UNITED STATES PATENTS

| Number | Name | Date |
|---|---|---|
| 211,775 | Patterson | Jan. 28, 1879 |
| 507,654 | Grier | Oct. 31, 1893 |
| 847,834 | Sears et al. | Mar. 19, 1907 |
| 1,580,094 | White | Apr. 6, 1926 |
| 1,582,468 | Heald et al. | Apr. 27, 1926 |
| 1,679,212 | Forman | July 31, 1928 |
| 1,791,013 | Rudolph | Feb. 3, 1931 |
| 1,861,742 | Hand | June 7, 1932 |
| 1,990,052 | Sosa | Feb. 5, 1935 |
| 2,000,805 | West et al. | May 7, 1935 |
| 2,183,430 | Monroe | Dec. 12, 1939 |
| 2,253,303 | La Pointe | Aug. 19, 1941 |
| 2,274,191 | Davis | Feb. 24, 1942 |
| 2,372,825 | Grad | Apr. 3, 1945 |
| 2,410,967 | Eaton | Nov. 12, 1946 |